(12) United States Patent
Takahashi et al.

(10) Patent No.: US 9,766,375 B2
(45) Date of Patent: Sep. 19, 2017

(54) ANTIREFLECTION FILM, LENS, AND IMAGING DEVICE

(71) Applicant: FUJIFILM Corporation, Tokyo (JP)

(72) Inventors: Hiroki Takahashi, Saitama (JP); Takeshi Iida, Sano (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/440,992

(22) Filed: Feb. 23, 2017

(65) Prior Publication Data

US 2017/0160436 A1 Jun. 8, 2017

Related U.S. Application Data

(63) Continuation of application No. PCT/JP2015/075279, filed on Sep. 7, 2015.

(30) Foreign Application Priority Data

Sep. 30, 2014 (JP) ................................ 2014-202655

(51) Int. Cl.
G02B 1/111 (2015.01)
G02B 1/115 (2015.01)
C03C 17/34 (2006.01)

(52) U.S. Cl.
CPC .......... *G02B 1/115* (2013.01); *C03C 17/3405* (2013.01); *G02B 1/111* (2013.01)

(58) Field of Classification Search
CPC .. G02B 1/11; G02B 1/111; G02B 1/12; C03C 17/34; C03C 17/3405; C03C 17/3411; C03C 17/3429; C03C 17/3441

(Continued)

(56) References Cited

U.S. PATENT DOCUMENTS 4,859,536 A 8/1989 Waddell et al.
8,535,807 B2 9/2013 Kurihara
(Continued)

FOREIGN PATENT DOCUMENTS

JP 64-80903 A 3/1989
JP 2006-36611 A 2/2006
(Continued)

OTHER PUBLICATIONS

International Preliminary Report on Patentability for PCT/JP2015/075279 (PCT/IPEA/409) mailed Jan. 18, 2017.
(Continued)

Primary Examiner — Kimberly N Kakalec
(74) Attorney, Agent, or Firm — Birch, Stewart, Kolasch & Birch, LLP

(57) ABSTRACT

In the antireflection film, a hydrogenated carbon film as a first layer is formed on a surface of an optical substrate. A $MgF_2$ film as a second layer having a lower refractive index than the first layer is formed on the first layer and functions as a low refractive index layer. The hydrogenated carbon film and the $MgF_2$ film are formed using a RF magnetron sputtering equipment. During the formation of the hydrogenated carbon film, a mixed gas of argon and hydrogen is supplied to a vacuum chamber such that some of C—C bonds in the film are replaced with C—H bonds. Some of C—C bonds are cut by hydrogenation, and strains (stress) accumulating due to C—C bonds can be relaxed. As a result, the antireflection film which has excellent adhesiveness and is not broken is obtained.

5 Claims, 7 Drawing Sheets

(58) Field of Classification Search
USPC .................................................. 359/577–590
See application file for complete search history.

(56) References Cited

U.S. PATENT DOCUMENTS

| | | |
|---|---|---|
| 2009/0159840 A1 | 6/2009 | Oda et al. |
| 2010/0171406 A1 | 7/2010 | Morino et al. |
| 2011/0013243 A1* | 1/2011 | Bates .................. G03H 1/0252 359/3 |
| 2011/0244224 A1 | 10/2011 | Kurihara |

FOREIGN PATENT DOCUMENTS

| | | |
|---|---|---|
| JP | 2011-221048 A | 11/2011 |
| JP | 2014-32213 A | 2/2014 |
| WO | WO 2009/038143 A1 | 3/2009 |
| WO | WO 2014/008484 A2 | 1/2014 |

OTHER PUBLICATIONS

International Search Report for PCT/JP2015/075279 (PCT/ISA/210) mailed on Dec. 8, 2015.
Written Opinion of the International Searching Authority for PCT/JP2015/075279 (PCT/ISA/237) mailed on Dec. 8, 2015.

* cited by examiner

ANTIREFLECTION FILM, LENS, AND IMAGING DEVICE

CROSS-REFERENCE TO RELATED APPLICATION

This application is a Continuation of PCT International Application PCT/JP2015/075279 filed on 7 Sep. 2015, which claims priority under 35 USC 119(a) from Japanese Patent Application No. 2014-202655 filed on 30 Sep. 2014. The above application is hereby expressly incorporated by reference, in its entirety, into the present application.

BACKGROUND OF THE INVENTION

1. Field of the Invention

The present invention relates to an antireflection film which is provided on a surface of an optical filter, a lens, or the like, a lens, and an imaging device.

2. Description of the Related Art

Chalcogenide glass includes, for example, sulfur (S), germanium (Ge), selenium (Se), or tellurium (Te) as a major component. This chalcogenide glass is cheaper than Ge crystals, which are a material of the related art, and can be easily processed into a desired shape of an optical element by mold forming. Therefore, chalcogenide glass has been highly anticipated as an optical member such as a lens or an optical filter in which far infrared rays (8 to 14 μm (which has the same meaning as 8 μm or more and 14 μm or less; hereinafter, the expression "to" is used to express a range including boundary values) are used.

Since the refractive index of chalcogenide glass is 2.5 to 2.6, the surface reflectance is high, and the transmittance remains at about 60%. Therefore, only a simple method of processing chalcogenide glass into a shape of a lens or the like is not sufficient to obtain a sufficient imaging light amount. Therefore, in order to reduce light amount loss caused by surface reflection, an antireflection film is provided on a substrate formed of chalcogenide glass (refer to JP2014-032213A and JP2011-221048A corresponding to U.S. Pat. No. 8,535,807).

In the related art, Ge which is a constituent element of a substrate or a compound (sulfide) including sulfur (S) which is an element belonging to the same group as Se, is used as an adhesion layer to configure an antireflection film. The reason why the layer formed of Ge or a sulfide exhibits high adhesiveness with a substrate formed of chalcogenide glass is that a strong bond is formed at an interface between the substrate and the film, the strong bond being a Ge—Ge bond which is formed in a case where both the substrate and the film are formed of Ge, or a Se—S bond which is formed in a case where the substrate includes Se. In particular, the Ge—Ge bond is a covalent bond (sp3) having a high bonding strength and is more preferably used than a sulfide from the viewpoint of easiness of film formation and maintenance of the device.

A high bonding strength in a Ge—Ge bond or the like is generated in a case where an element on the film side is an element belonging to the same group as Ge. For example, a Ge—Si bond which is formed in a case where a substrate is formed of Ge and a film is formed of silicon (Si), or a Ge—C bond which is formed in a case where a substrate is formed of Ge and a film is formed of carbon (C) has a high bonding strength. However, Si is not transparent to far infrared rays (8 to 14 μm) and thus is inappropriate as a film forming material.

On the other hand, C is transparent to a far infrared region as long as it has a diamond structure (sp3), and forms a covalent bond (sp3) with Ge on a substrate side and exhibits high adhesiveness. It is difficult to form a C film (carbon film) having a complete diamond structure, but a C film having a diamond-like carbon (DLC) structure can be formed by optimizing film forming conditions. Such a DLC film is an amorphous carbon film in which a C-atom skeleton structure has both diamond sp3 and graphite sp2.

The DLC film has an amorphous structure in which, unlike in a crystalline structure, there is no periodicity in atom arrangement and bond angle or distances between atoms are irregularly distributed. Therefore, strains (internal stress) are likely to accumulate in the amorphous structure. Therefore, it was verified that, in a case where a DLC film having a thickness of several hundreds of nanometers is formed, the film is broken by internal stress. Accordingly, only a simple method of forming a DLC film on a substrate formed of chalcogenide glass is insufficient, and it is necessary to secure adhesiveness.

SUMMARY OF THE INVENTION

The present invention has been made in order to solve the above-described problems, and an object thereof is to provide an antireflection film having excellent adhesiveness, a lens, and an imaging device.

According to the present invention, there is provided an antireflection film that is provided on a surface of a substrate formed of chalcogenide glass, the film comprising a plurality of layers in order from the substrate side, in which a first layer in contact with the substrate is formed of a hydrogenated carbon film.

It is preferable that a hydrogen content ch in the hydrogenated carbon film is in a range of 0 [at. %]<ch≤6.1 [at. %]. It is more preferable that the hydrogen content ch is in a range of 0 [at. %]<ch≤1.8 [at. %].

It is preferable that a second layer is laminated on the first layer and has a lower refractive index than the first layer. In addition, it is preferable that a plurality of first layers and a plurality of second layers are alternately laminated.

It is preferable that a refractive index of the second layer at a wavelength of 10.5 μm is 1.5 or lower. In addition, it is preferable that the second layer is formed of the $MgF_2$ film. It is preferable that the hydrogenated carbon film is formed by sputtering a carbon target in a gas atmosphere including $H_2$. In addition, a chalcogenide glass lens according to the present invention includes the above-described antireflection film. An imaging device according to the present invention includes at least one chalcogenide glass lens including the above-described antireflection film.

According to the present invention, the first layer in contact with the substrate formed of chalcogenide glass is formed of the hydrogenated carbon film. As a result, a DLC film can be formed on the surface of the substrate. During the formation of the DLC film, some of C—C bonds in the DLC film are replaced with C—H bonds such that the DLC film is hydrogenated. As a result, some of C—C bonds are cut by hydrogenation. As a result, strains (stress) accumulating due to the C—C bonds can be relaxed, film breakage can be prevented, and an antireflection film having excellent adhesiveness can be obtained.

DESCRIPTION OF THE PREFERRED EMBODIMENTS

Figure 1:
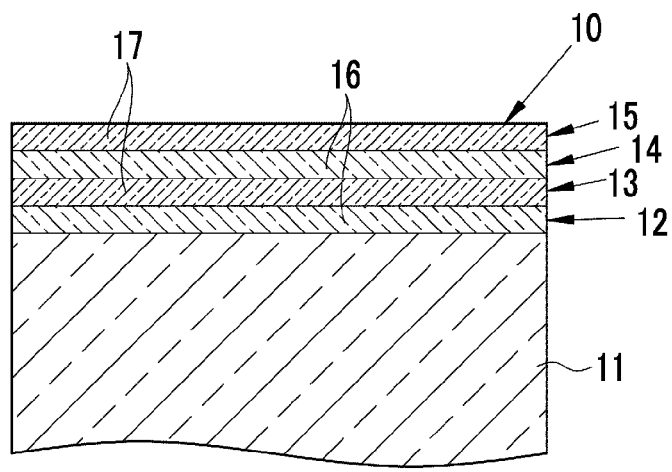
FIG. 1 is a cross-sectional view showing an antireflection film according to the present invention including four layers.

As shown in FIG. 1, an antireflection film 10 for chalcogenide glass (hereinafter, referred to simply as "antireflection film") according to the present invention is provided on a surface of an optical substrate 11. The optical substrate 11 is a lens or an optical filter that is formed by using chalcogenide glass as a substrate. In FIG. 1, the optical substrate 11 is formed of one material. However, for example, an optical functional film such as a polarization separation film or a dichroic film may be formed on a surface of the optical substrate 11. In this case, the antireflection film 10 is formed on the optical functional film. In addition, in FIG. 1, the optical substrate 11 has a planar surface but may have a curved surface on which a lens surface is formed.

The antireflection film 10 is a multi-layer film in which two kinds of thin films having different refractive indices are laminated, in which a first layer 12, a second layer 13, a third layer 14, and a fourth layer 15 are formed in this order from the optical substrate 11 side. The first layer 12 and the third layer 14 are formed of a hydrogenated carbon film 16 and function as a high refractive index layer. The second layer 13 and the fourth layer 15 are formed of a magnesium fluoride ($MgF_2$) film 17 and function as a low refractive index layer having a lower refractive index than the high refractive index layer. The fourth layer 15 is exposed at an air interface.

It is preferable that a refractive index of the second layer 13 and the fourth layer 15 at a wavelength of 10.5 μm is 1.5 or lower. In a case where the refractive index is 1.5 or lower, a lower reflectance than that in a case where the refractive index is higher than 1.5 can be achieved, which is preferable.

The number of hydrogenated carbon films 16 and the number of $MgF_2$ films 17 for forming the antireflection film 10 are arbitrary. For example, the antireflection film 10 includes four layers including two hydrogenated carbon films 16 and two $MgF_2$ films 17. Each of the hydrogenated carbon film 16 and the $MgF_2$ film 17 has a thickness of about 300 nm to 3000 nm, and the total thickness of the antireflection film 10 is, for example, about 4000 nm to 6000 nm.

Figure 2:
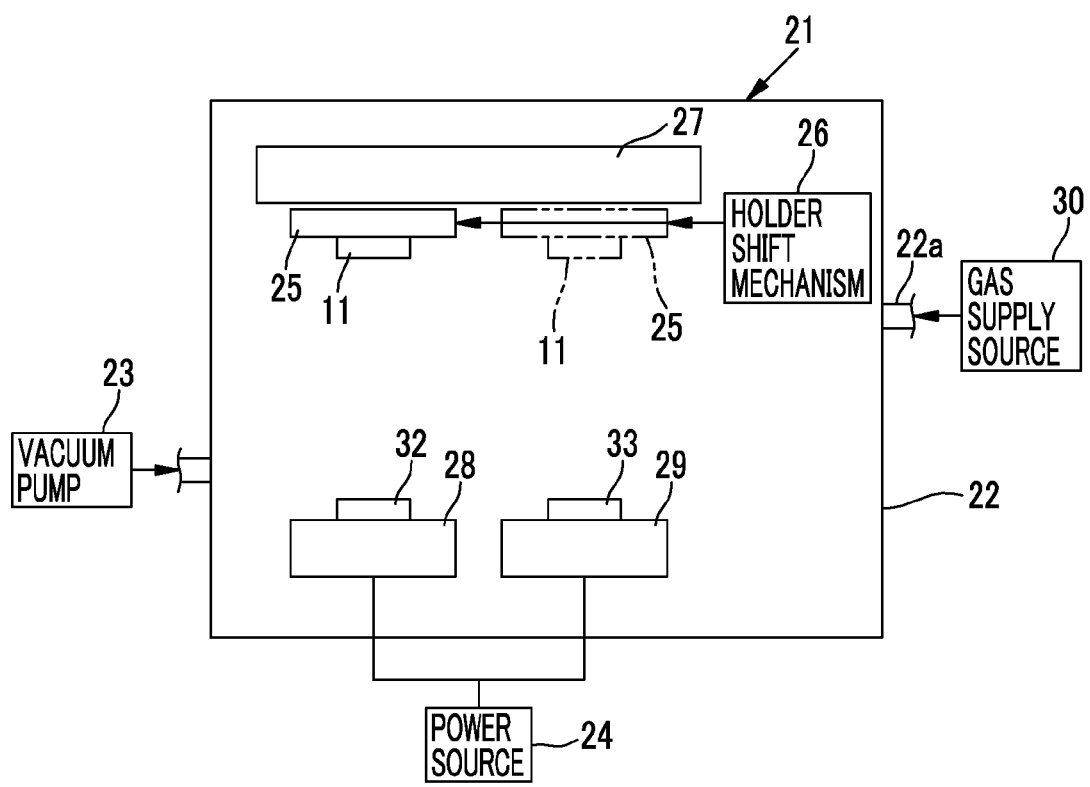
FIG. 2 is a front view showing the summary of a sputtering equipment which forms an antireflection film.

As shown in FIG. 2, the hydrogenated carbon film 16 and the $MgF_2$ film 17 are formed by sputtering using a radio-frequency (RF) magnetron sputtering equipment (hereinafter, referred to simply as "sputtering equipment") 21. This sputtering equipment 21 includes a vacuum chamber 22, a vacuum pump 23, and a power source 24. In the vacuum chamber 22, for example, a substrate holder 25, a holder shift mechanism 26, a heater 27, target holders 28 and 29, a vacuum gauge (not shown), and a film thickness meter (not shown) are provided.

A gas supply source 30 is connected to the vacuum chamber 22 through a gas introduction port 22a. The vacuum pump 23 evacuates the vacuum chamber 22. The gas supply source 30 supplies a mixed gas ($Ar+H_2$) of argon (Ar) and hydrogen (H) or argon gas (Ar) to the vacuum chamber 22. The mixed gas ($Ar+H_2$) is supplied to the vacuum chamber 22 during the formation of the hydrogenated carbon film 16, and Ar gas is supplied to the vacuum chamber 22 during the formation of the $MgF_2$ film 17. In these gas atmospheres, sputtering is performed.

The substrate holder 25 holds the optical substrate 11 on which the antireflection film 10 is formed. The holder shift mechanism 26 moves the substrate holder 25 in a horizontal direction such that the optical substrate 11 is selectively positioned above the target holders 28 and 29.

One of the target holders 28 and 29 holds a carbon target 32, and the other one holds a $MgF_2$ target 33. Each of the target holders 28 and 29 has a permanent magnet (not shown) and is connected to the power source 24. Ar atoms which are ionized by the power source 24 applying a voltage thereto are accelerated and have a high kinetic energy. At this time, the accelerated Ar ions collide against a surface of one of the targets 32 and 33 for film formation such that the high kinetic energy of the Ar ions is transferred to target atoms. The target atoms having the energy are accelerated at a high speed, are emitted from one of the targets 32 and 33, and are deposited on the optical substrate 11 to form a film.

First, the optical substrate 11 is positioned above the carbon target 32 by the holder shift mechanism 26 and forms the hydrogenated carbon film 16. After the hydrogenated carbon film 16 having a desired thickness is formed, the optical substrate 11 is positioned above the $MgF_2$ target 33 to form the $MgF_2$ film 17. Next, by repeating the same operations as described above, the first layer 12 formed of the hydrogenated carbon film 16, the second layer 13 formed of the $MgF_2$ film 17, the third layer 14 formed of the hydrogenated carbon film 16, and the fourth layer 15 formed of the $MgF_2$ film 17 are formed in this order on the optical substrate 11.

Figure 3:
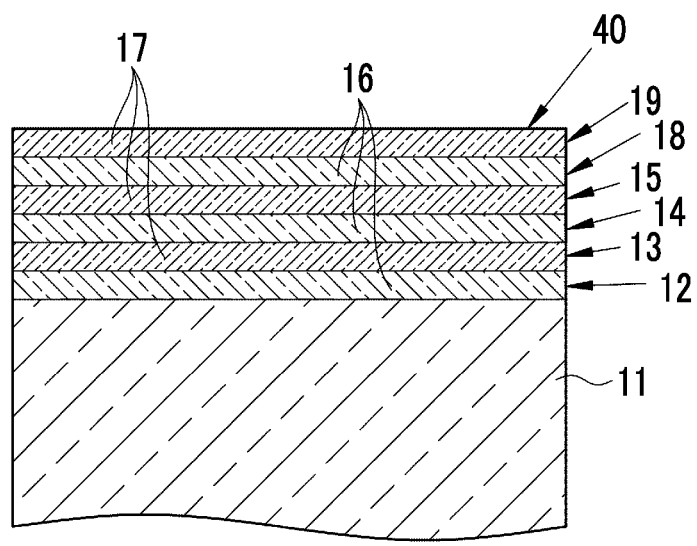
FIG. 3 is a cross-sectional view showing an antireflection film including six layers.

In the above-described embodiment, the antireflection film 10 is formed in which the four layers are laminated by alternately providing the high refractive index layer formed of the hydrogenated carbon film 16 and the low refractive index layer formed of the $MgF_2$ film 17. However, in the antireflection film 10 according to the present invention, the number of high refractive index layers formed of the hydrogenated carbon film 16 and the number of low refractive index layers formed of the MgF$_2$ film 17 are arbitrary. For example, as in an antireflection film 40 shown in FIG. 3, the antireflection film according to the present invention may have a six-layer structure which further includes a fifth layer 18 formed of the hydrogenated carbon film 16 and a sixth layer 19 formed of the MgF$_2$ film 17.

In the above-described embodiment, all of high refractive index layers in the antireflection film 10 are formed of the hydrogenated carbon film 16. However, as the high refractive index layer formed of the hydrogenated carbon film 16, only the first layer in contact with the optical substrate 11 may be used. In this case, a second high refractive index layer may be formed of a ZnS$_2$ or Ge film. Further, a second low refractive index layer may be formed of an oxide film such as CeO$_2$ instead of MgF$_2$.

In the above-described embodiment, the low refractive index layers formed of the MgF$_2$ film 17 is exposed on the surface of the antireflection film 10 and thus exhibits oil repellency and water repellency and functions as a protective layer.

In the above-described embodiment, the antireflection film 10 is formed using two kinds of the hydrogenated carbon film 16 and the MgF$_2$ film 17 having different refractive indices. However, the antireflection film according to the present invention may be formed by laminating three kinds or more of films having different refractive indices.

In the above-described embodiment, the hydrogenated carbon film 16 having a desired refractive index is obtained by fixing a ratio of the flow rate of a hydrogen to the flow rate of Ar gas and changing a sputtering power. However, the hydrogenated carbon film 16 having a desired refractive index may be obtained by fixing a sputtering power and changing a ratio of the flow rate of hydrogen to the flow rate of the mixed gas (Ar+H$_2$).

The kind of the optical substrate 11 on which the antireflection film according to the present invention is provided is arbitrary, and examples thereof include lenses and various optical filters. In the antireflection film according to the present invention, the adhesion with the optical substrate 11 is reinforced and thus is suitable as, for example, a lens of an outdoor surveillance camera or as a protective filter of a storage case in which a surveillance camera is stored.

Figure 4:
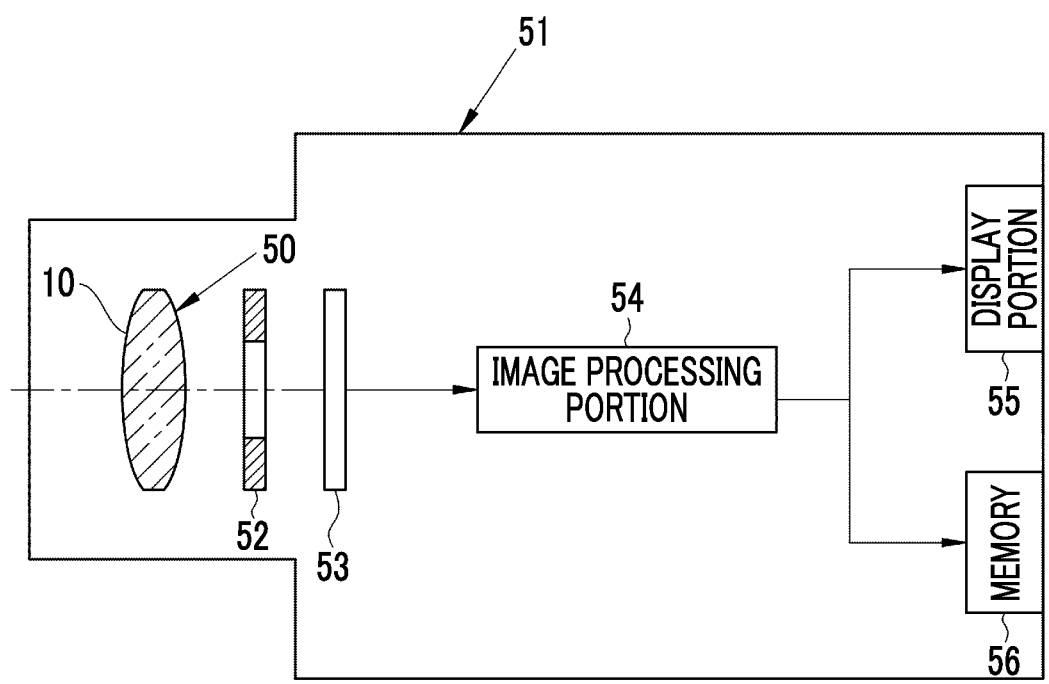
FIG. 4 is a schematic diagram showing a far infrared camera which includes a lens including the antireflection film according to the present invention.

FIG. 4 is a far infrared camera (imaging device) 51 which includes a chalcogenide glass lens 50 including the antireflection film 10 according to the present invention. The far infrared camera 51 detects a radiation energy (heat) in a wavelength range of 8 to 14 μm generated from an object and converts a small amount of temperature change into an electrical signal to display an image. To that end, the far infrared camera 51 includes not only the lens 50 but also a diaphragm 52, an uncooled far infrared array sensor 53 that operates at room temperature, an image processing portion 54, a display portion 55, and a memory 56. The single lens 50 or a plurality of lenses 50 may be used in which at least one lens 50 includes the antireflection film 10 or 40 according to the present invention. The far infrared camera 51 is used, for example, not only as a night vision for a vehicle but also as a surveillance camera for monitoring an intruder or the like at night, as a camera for repair and maintenance such as building diagnosis or equipment diagnosis, or as a mechanical camera for automatically detecting a person with fever.

EXAMPLES

In order to verify the effects of the present invention, an experiment was performed, in which the hydrogenated carbon film 16 was formed on a surface of the optical substrate 11 formed of chalcogenide glass to examine the adhesiveness of the hydrogenated carbon film 16.

(Method of Forming Hydrogenated Carbon Film)

Using the RF magnetron sputtering equipment (BMS-800, manufactured by Shincron Co., Ltd.) 21 schematically shown in FIG. 2, the hydrogenated carbon film 16 was formed by using a six-inch diameter target (manufactured by Ulvac Inc.) as the carbon target 32.

Forming conditions were as follows.

Sputtering power: 750 W to 375 W (during formation of the hydrogenated carbon film 16), 375 W (during the formation of the MgF$_2$ film 17)

Sputtering gas: a mixed gas Ar+H$_2$ (during the formation of the hydrogenated carbon film 16; flow rate: 120 sccm, the ratio of the flow rate of hydrogen: fixed to 2.5%), Ar gas (during the formation of the MgF$_2$ film 17)

Sputtering gas pressure: 0.2 Pa

Distance between the optical substrate 11 and the targets 32 and 33: 120 mm

Heating temperature of the optical substrate 11: heated to 300° C. by the heater 27

First, Experiments 1 to 8 were performed while changing the sputtering power. As a result, eight kinds of hydrogenated carbon films 16 according to Samples 1 to 8 were formed. The refractive index of each of the obtained hydrogenated carbon films 16 was measured using a spectroscopic ellipsometer (IR-Vase, manufactured by J. A. Woollam Co., Inc.).

Figure 5:
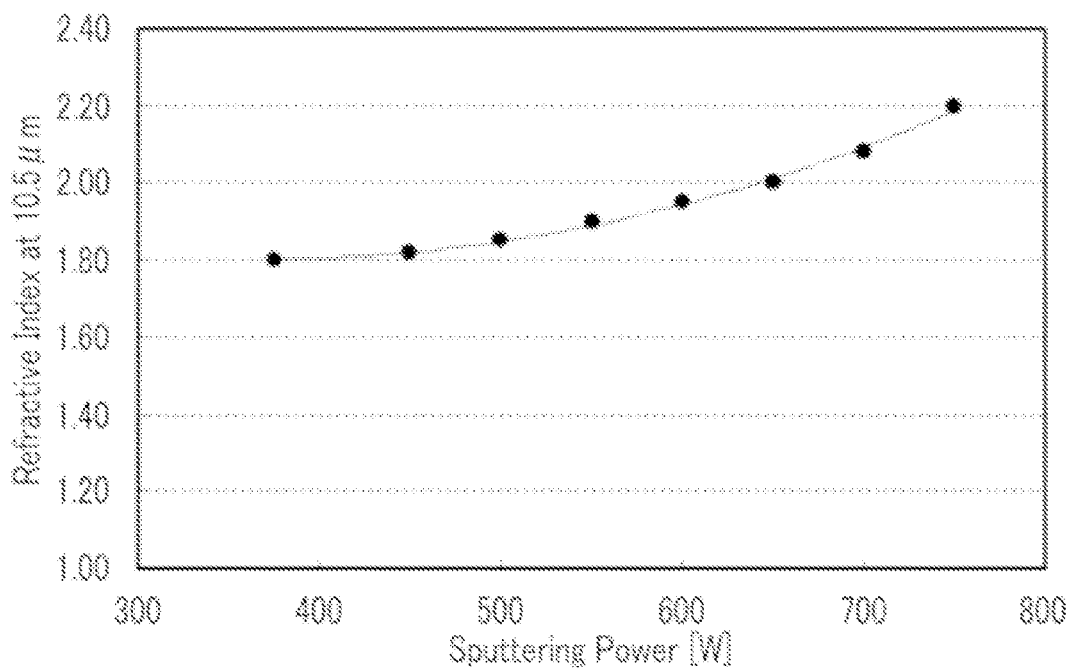
FIG. 5 is a graph showing a relationship between a refractive index of a hydrogenated carbon film and a sputtering power during film formation.

FIG. 5 shows a relationship between a sputtering power and a refractive index of the obtained hydrogenated carbon film 16. It can be seen from FIG. 5 that, as the sputtering power decreases, the refractive index of the hydrogenated carbon film 16 decreases. This decrease in refractive index is caused by hydrogen being incorporated into the hydrogenated carbon film 16. As the ratio of the flow rate of hydrogen to the flow rate of Ar gas increases, the hydrogen content ch in the hydrogenated carbon film 16 increases. The increase in the hydrogen content ch leads to a decrease in film density, and the refractive index decreases due to the decreases in film density.

Figure 6:
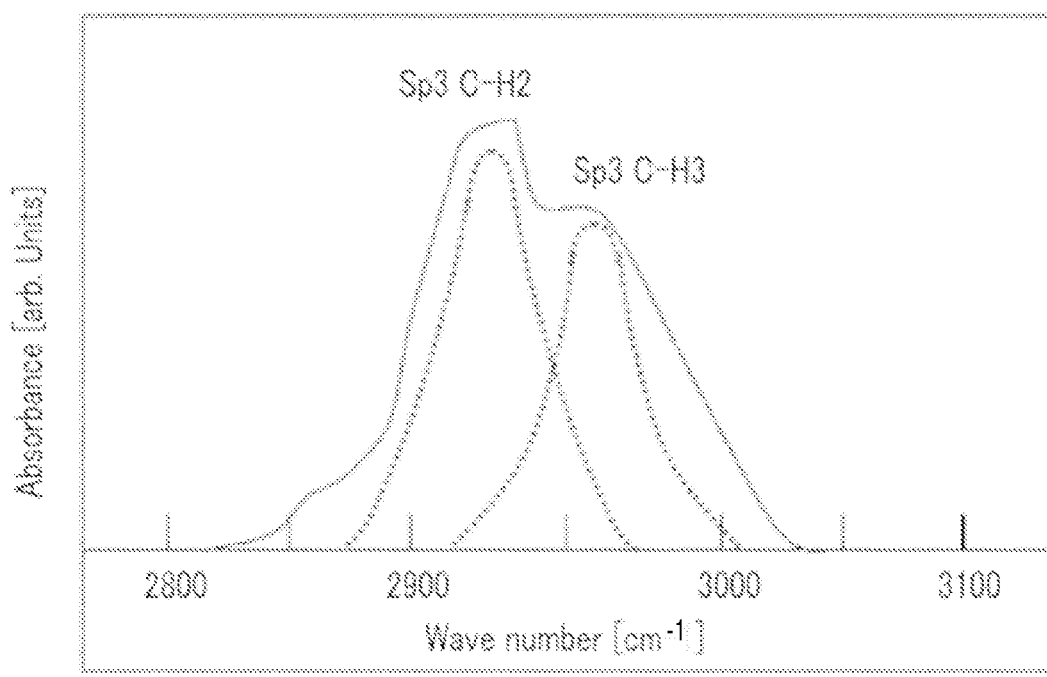
FIG. 6 is a graph showing the results of FT-IR spectroscopy of the hydrogenated carbon film and showing a relationship between a wave number and an absorbance.
Figure 7:
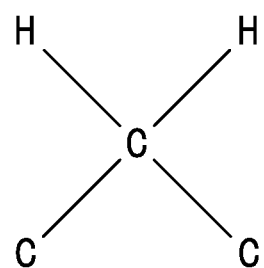
FIG. 7 is a diagram showing a C—H2 bond in which two hydrogen atoms are bonded to a carbon atom.
Figure 8:
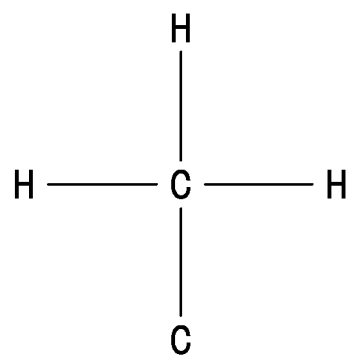
FIG. 8 is a diagram showing a C—H3 bond in which three hydrogen atoms are bonded to a carbon atom.

FIG. 6 shows the results of measuring the obtained hydrogenated carbon film 16 using a FT-IR (FT/IR 4200, manufactured by Jasco Corporation), in which the horizontal axis represents a wave number and the vertical axis represents an absorbance. As can be seen from FIG. 6, a first absorption peak was shown at a wave number of about 2930 cm$^{-1}$, and a second absorption peak was shown at a wave number of about 2970 cm$^{-1}$. The first absorption peak was derived from a structure shown in FIG. 7 in which two atoms are bonded to a carbon atom, and the second absorption peak was derived from a structure shown in FIG. 8 in which three atoms are bonded to a carbon atom.

Figure 9:
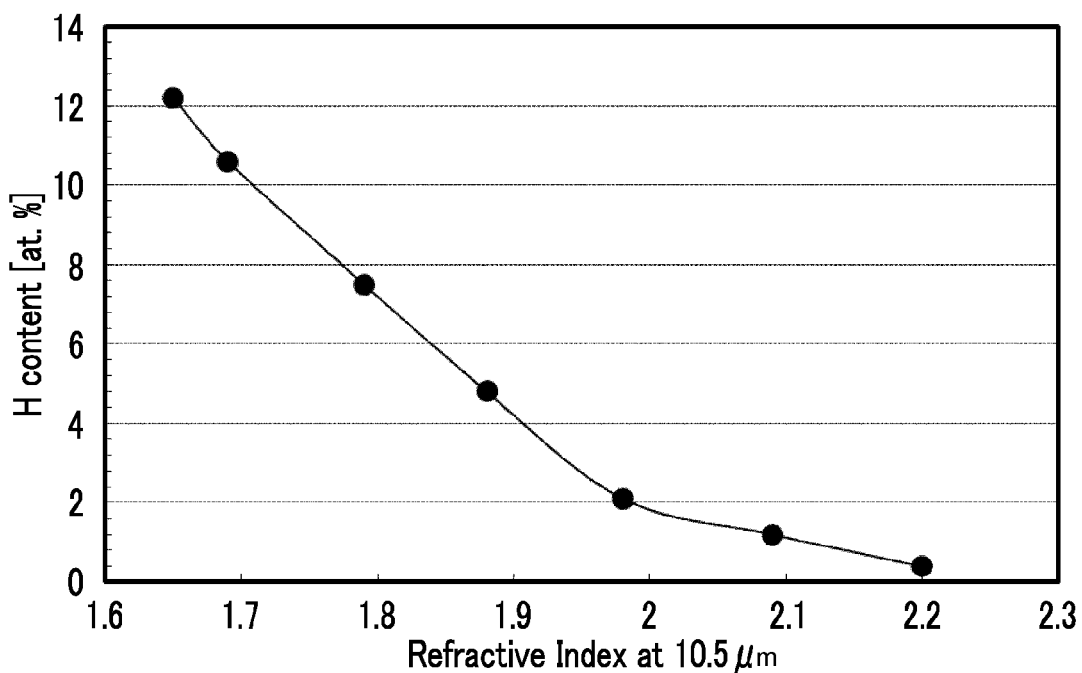
FIG. 9 is a graph showing a relationship between a refractive index of a hydrogenated carbon film and a hydrogen content thereof.

FIG. 9 shows a relationship between the refractive index of the hydrogenated carbon film 16 and the hydrogen content ch in the film. In FIG. 9, the horizontal axis represents the refractive index of the hydrogenated carbon film 16 at 10.5 μm, and the vertical axis represents the hydrogen content ch (H content) in the film 16. The hydrogen content ch in the film 16 was measured by elastic recoil detection analysis (ERDA). As is known in the art, in the elastic recoil detection analysis, a sample was bombarded with helium ions such that an atom in the sample was forwardly scattered, and this scattered element was detected. This elastic recoil detection analysis is suitable for measuring the hydrogen content ch in the film.

The phenomenon shown in FIG. 5 in which the refractive index decreases along with an decrease in sputtering power correlates to the hydrogen content ch in the film as shown in FIG. 9. The following can be seen from FIG. 9 that: in a case where the refractive index is 2.0 or higher, the amount of C—H2 bonds is large; and in a case where the refractive index is lower than 2.0, the amount of C—H3 bonds rapidly increases. The amount of each of C—H2 bonds and C—H3 bonds in FIG. 9 was estimated from peaks of a C—H stretching mode appearing in a range of 2900 to 3000 cm$^{-1}$ in the results of FT-IR spectroscopy.

It can be seen from a binding energy of a C1s orbital in X-ray photoelectron spectroscopy (XPS; in which X-rays were used) that the C skeleton of the hydrogenated carbon film 16 was a mixture of sp3 (diamond structure) and sp2 (graphite structure). A ratio between the structures was constant irrespective of the ratio of the flow rate of hydrogen to the flow rate to Ar gas. In X-ray photoelectron spectroscopy, a material is irradiated with X-rays such that photoelectrons in the material are emitted to the outside, and the number of photoelectrons emitted and the kinetic energy thereof were measured. As a result, the energy of states in which the electrons occupy the material and the density of states thereof can be obtained.

TABLE 1

| Experiment No. (Sample No.) | Sputtering Power [W] | Refractive Index at 10.5 μm | Hydrogen Content [at. %] | Main Bond | Adhesive Strength Evaluation |
|---|---|---|---|---|---|
| 1 | 375 | 1.80 | 7.2 | C—H3 | D |
| 2 | 450 | 1.82 | 6.7 | C—H3 | D |
| 3 | 500 | 1.85 | 6.1 | C—H3 | C |
| 4 | 550 | 1.90 | 4.5 | C—H3 | B |
| 5 | 600 | 1.95 | 2.6 | C—H3 | B |
| 6 | 650 | 2.00 | 1.8 | C—H2 | A |
| 7 | 700 | 2.08 | 1.3 | C—H2 | A |
| 8 | 750 | 2.20 | 0.4 | C—H2 | A |

Table 1 shows the results of investigating a relationship between the hydrogen content of the hydrogenated carbon film and the adhesiveness between the optical substrate formed of chalcogenide glass and the hydrogenated carbon film. Samples 1 to 8 of Table 1 were formed while changing the sputtering power during film formation in Experiments 1 to 8, and each of the hydrogenated carbon films 16 was deposited in a thickness of 100 nm on the optical substrate 11 formed of flat chalcogenide glass (Ge: 20%, Se: 65%, and Sb: 15%). The adhesiveness of each of the hydrogenated carbon films 16 was evaluated using a tape test method according to JIS-H-8504 15.1 and MIL-C-48497A. In the tape test method, each of the samples 1 to 8 was left to stand in an environment of temperature: 60° C. and relative humidity: 90% for 240 hours. Next, a cellophane tape (manufactured by Nichiban Co., Ltd.; width: 12 mm) having a length of 10 mm was attached to the hydrogenated carbon film 16 and then was rapidly peeled off in a vertical direction. This operation was repeated three times, and then the peeling state of the hydrogenated carbon film 16 was observed. The hydrogenated carbon film 16 was evaluated from the observation result based on the following criteria.

Rank A: the hydrogenated carbon film 16 was not peeled off even after the peeling operation was repeated three times Rank B: the hydrogenated carbon film 16 was damaged in the event that the peeling operation was repeated three times, and the matrix of the optical substrate 11 was not observed Rank C: the hydrogenated carbon film 16 was damaged in the event that the peeling operation was repeated two times, and the matrix of the optical substrate 11 was not observed Rank D: the hydrogenated carbon film 16 was damaged in the event that the peeling operation was repeated once, and the matrix of the optical substrate 11 was observed As can be seen from Table 1, in Samples 6 to 8 in which the hydrogen content ch in the hydrogenated carbon film 16 was 1.8 at. % or lower (the refractive index was 2 or higher), the hydrogenated carbon film 16 was not damaged and was evaluated as A. In Samples 3 to 5 in which the hydrogen content ch was in a range of 2.6 to 6.1 at. %, Samples 4 and 5 were evaluated as B, and Sample 3 was evaluated as C. In all of the samples 3 to 5, the hydrogenated carbon film 16 was damaged but was not peeled off. On the other hand, in Samples 1 and 2 in which the hydrogen content ch was in a range of 6.7 to 7.2 at. %, the hydrogenated carbon film 16 was peeled off and was evaluated as D. Based on the above results, the following can be seen that the hydrogen content ch in the hydrogenated carbon film 16 at which the adhesiveness with the optical substrate 11 is maintained is in a range of 2.6 to 6.1 at. % and the most preferable range thereof for preventing the peeling of the film is 1.8 at % or lower. Based on the above results, it can be seen that the hydrogen content ch in the hydrogenated carbon film 16 is preferably in a range of 0 [at. %]<ch≤6.1 [at. %]. In a case where the hydrogen content ch is higher than 0 at. %, cracking caused by film stress does not occur and the carbon film can be maintained as compared to a case where the hydrogen content ch is 0. In a case where the hydrogen content ch is 6.1 at. % or lower, the adhesive strength is obtained and the hydrogenated carbon film 16 is not peeled off as compared to a case where the hydrogen content ch is higher than 6.1 at. %. It is more preferable that the hydrogen content ch is in a range of 0 [at. %]<ch≤1.8 [at. %]. In a case where the hydrogen content ch is 1.8 at. % or lower, the adhesive strength is reliably obtained and the hydrogenated carbon film 16 is not peeled off as compared to a case where the hydrogen content ch is higher than 1.8 at. %.

Next, the two-layer structure including the hydrogenated carbon film 16 and the MgF$_2$ film 17 was formed twice such that the antireflection film 10 having the four-layer structure was formed on the optical substrate 11. As the optical substrate 11, chalcogenide glass (manufactured by Opto Create Co., Ltd.) including 20% of Ge, 65% of Se, and 15% of Sb was used. Referring to the experiment results of Table 1, the antireflection film 10 was formed such that it includes one of seven kinds of hydrogenated carbon films 16 in which the refractive index was in a range of 1.80 to 2.24 and in which the hydrogen content ch in the hydrogenated carbon film 16 was in a range of 7.2 to 0.0 at. %.

Table 2 shows the experiment results of each of the antireflection films according to Examples 1 to 5 and Reference Examples 1 and 2 regarding the refractive index and thickness of each layer, the average reflectance, and the adhesive strength evaluation. The reflectance R (%) was obtained from "R (%)=100−T (%)" based on the transmittance T obtained by FT-IR (FT-IR 4200 (manufactured by Jasco Corporation) was used).

The average reflectance was a value obtained by obtaining reflectances R at an interval of 4 cm$^{-1}$ (kayser) in a wavelength range of 8 to 14 μm and dividing the sum of the obtained reflectances R by the number of data. The kayser refers to the wave number at a length of 1 cm and expressed in [cm$^{-1}$]. Accordingly, a relationship between a reference wavelength λ0 [cm] and the kayser k [cm$^{-1}$] is defined as the following conditional expression.

$$\lambda n = 1/(1/\lambda 0 \pm (n-1) \times k)$$

Figure 14:
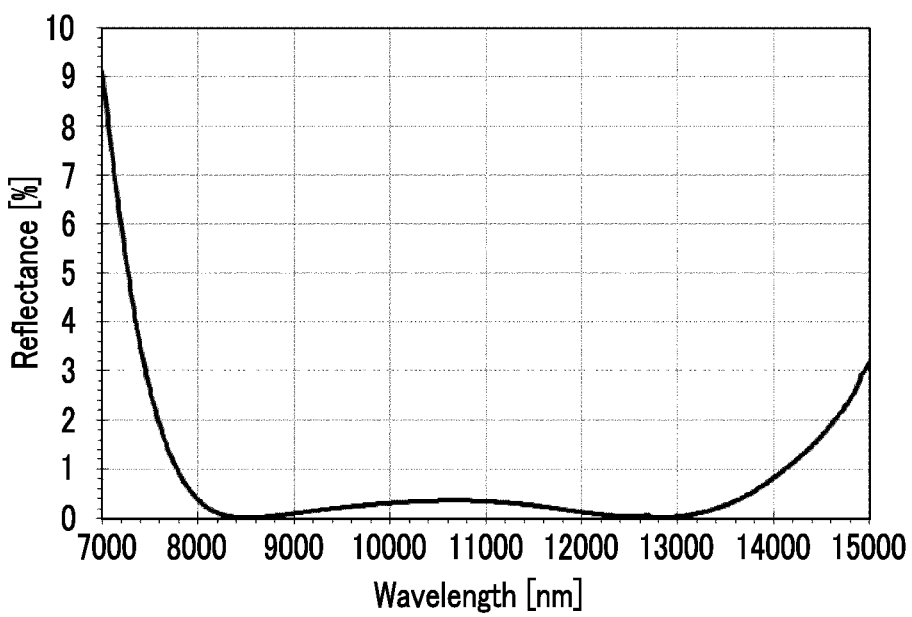
FIG. 14 is a graph showing a relationship between a wavelength and a reflectance in an antireflection film according to Example 5.

In this expression, n represents a natural number of 1 or more, and a wavelength λ1 measured in the event that n=1 matches with the reference wavelength λ0. The symbol ± can be appropriately selected depending on whether to obtain a wavelength on a longer wavelength side or a shorter wavelength side with respect to the reference wavelength.

to Example 4. FIG. 14 is a graph showing a relationship between a wavelength and a reflectance in the antireflection film according to Example 5. In this way, it can be seen that, in each of Examples 1 to 5, the antireflection film 10 having low reflection and an excellent adhesive strength was able to be obtained.

EXPLANATION OF REFERENCES

10: antireflection film
11: optical substrate

TABLE 2

| | Refractive Index at 10.5 μm/Thickness [nm] | | | | Hydrogen | Average Reflectance | Adhesive |
| | First Layer | Second Layer | Third Layer | Fourth Layer | Content [at. %] | at 8 to 14 μm | Strength Evaluation |
|---|---|---|---|---|---|---|---|
| Reference Example 1 | 1.80/1632 | 1.19/1927 | 1.80/317 | 1.19/2055 | 7.2 | 0.44 | D |
| Example 1 | 1.85/1387 | 1.19/704 | 1.85/220 | 1.19/1879 | 6.1 | 0.48 | C |
| Example 2 | 1.90/1303 | 1.19/690 | 1.90/274 | 1.19/2079 | 4.5 | 0.45 | B |
| Example 3 | 2.00/1449 | 1.19/1047 | 2.00/317 | 1.19/3000 | 1.8 | 0.23 | A |
| Example 4 | 2.10/1359 | 1.19/939 | 2.10/320 | 1.19/2887 | 1.3 | 0.18 | A |
| Example 5 | 2.20/1284 | 1.19/879 | 2.2/317 | 1.19/2809 | 0.4 | 0.20 | A |
| Reference Example 2 | 2.24/1200 | 1.19/750 | 2.24/305 | 1.19/2785 | 0.0 | — | E |

In the first layer 12 of Reference Example 1, the refractive index was 1.80, the thickness was 1632 nm, the hydrogen content ch was 7.2 at %, and the adhesive strength evaluation was D. On the other hand, in the first layer 12 of Example 1, the refractive index was 1.85, the thickness was 1387 nm, the hydrogen content ch was 6.1 at %, and the adhesive strength evaluation was C. In the first layer 12 of Reference Example 2, the refractive index was 1.90, the thickness was 1303 nm, the hydrogen content ch was 4.5 at %, and the adhesive strength evaluation was B. In the first layers 12 of Examples 3 to 5, the refractive indices were 2.0, 2.1, and 2.20, the thicknesses were 1449, 1359, and 1284 nm, the hydrogen contents ch were 1.8, 1.3, and 0.4 at %, and the adhesive strength evaluations were A. In the first layer 12 of Reference Example 2, the refractive index was 2.24, the thickness was 1200 nm, and the hydrogen content ch was 0.0 at %. As a result, cracking occurred due to film stress in the first layer 12, the multi-layer structure was not able to be maintained, and the adhesive strength evaluation was E which was lower than D.

Figure 10:
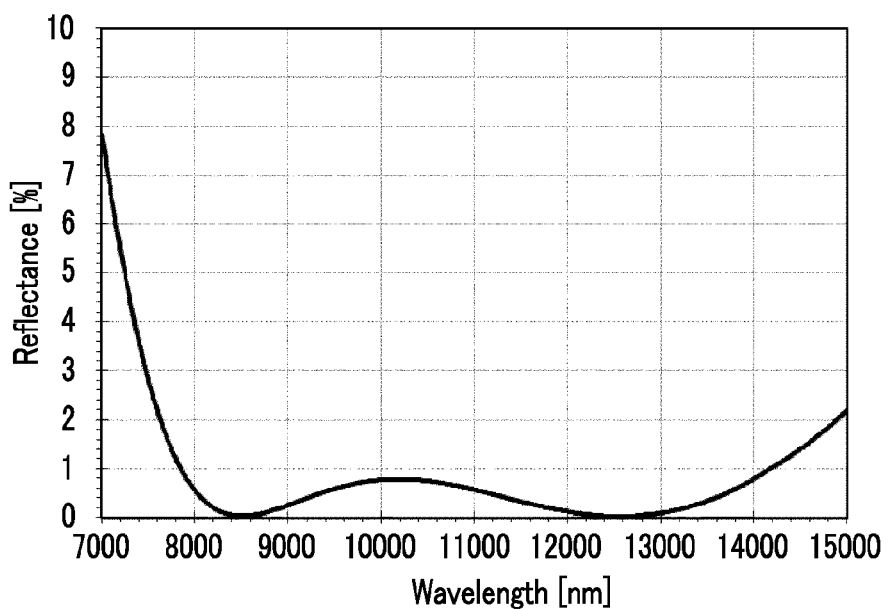
FIG. 10 is a graph showing a relationship between a wavelength and a reflectance in an antireflection film according to Example 1.
Figure 11:
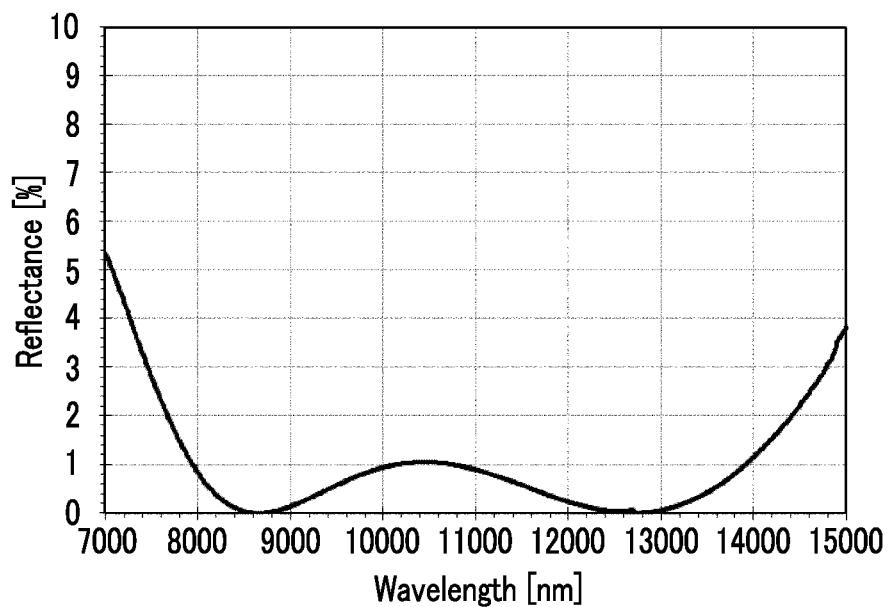
FIG. 11 is a graph showing a relationship between a wavelength and a reflectance in an antireflection film according to Example 2.
Figure 12:
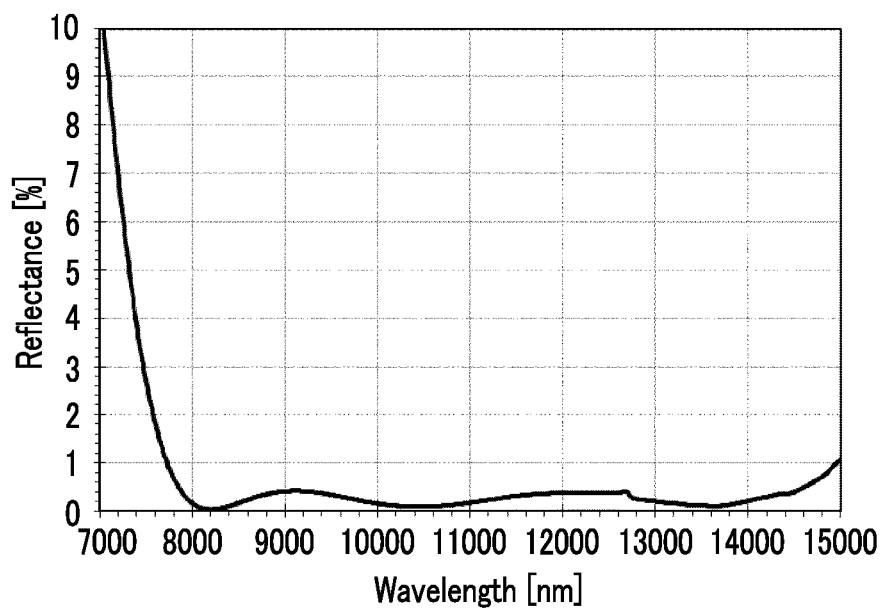
FIG. 12 is a graph showing a relationship between a wavelength and a reflectance in an antireflection film according to Example 3.
Figure 13:
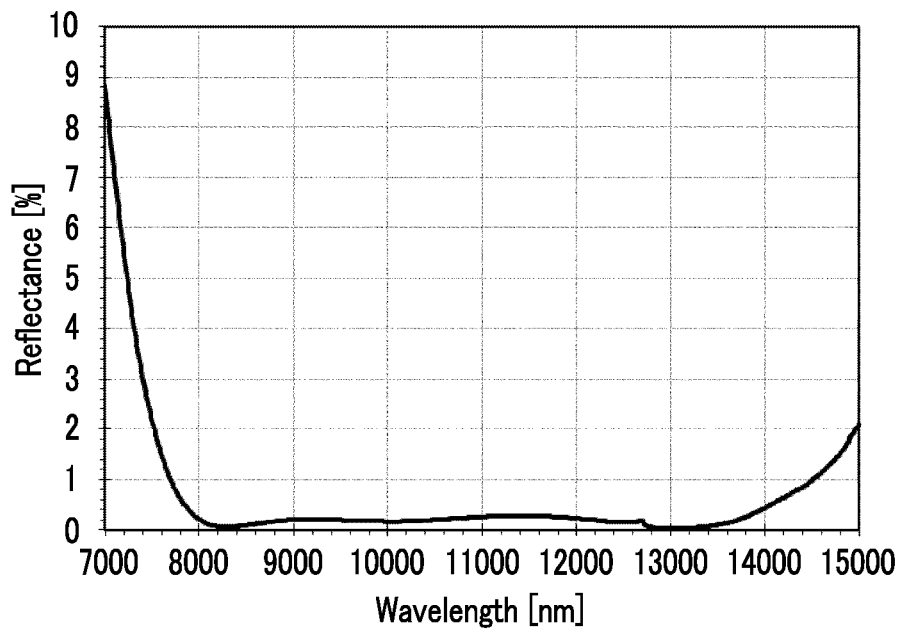
FIG. 13 is a graph showing a relationship between a wavelength and a reflectance in an antireflection film according to Example 4.

It was found from the above results that, in the first layers 12 of Examples 1, 2, 3, 4, and 5, the refractive indices were 1.85 to 2.20, the adhesive strength evaluations were A, and all the average reflectances in a range of 8 to 14 μm were 0.5% or lower. FIG. 10 is a graph showing a relationship between a wavelength and a reflectance in the antireflection film according to Example 1. FIG. 11 is a graph showing a relationship between a wavelength and a reflectance in the antireflection film according to Example 2. FIG. 12 is a graph showing a relationship between a wavelength and a reflectance in the antireflection film according to Example 3. FIG. 13 is a graph showing a relationship between a wavelength and a reflectance in the antireflection film according 12: first layer
13: second layer
14: third layer
15: fourth layer
16: hydrogenated carbon film
17: MgF$_2$ film
21: sputtering equipment
25: substrate holder
28 and 29: target holder
32: carbon target
33: MgF$_2$ target

What is claimed is:

1. An antireflection film that is provided on a surface of a substrate formed of chalcogenide glass containing Ge, Se and Sb, the film comprising
    a plurality of layers in order from the substrate side,
    wherein a first layer in contact with the substrate is formed of a hydrogenated carbon film,
    a hydrogen content ch in the hydrogenated carbon film is in a range of 0 [at. %]<ch≤6.1 [at. %],
    a second layer laminated on the first layer has a lower refractive index than the first layer,
    a plurality of the first layers and a plurality of the second layers are alternately laminated.

2. The antireflection film according to claim 1,
    wherein the first and third layers are formed of hydrogenated carbon films, the second and fourth layers are formed of MgF$_2$ films, and a refractive index of the MgF$_2$ films at a wavelength of 10.5 μm is 1.5 or lower.

3. The antireflection film according to claim 1,
    wherein the hydrogenated carbon film is formed by sputtering a carbon target in a gas atmosphere including H$_2$.

4. A chalcogenide glass lens comprising the antireflection film according to claim 1.

5. An imaging device comprising at least the single chalcogenide glass lens according to claim 4.

* * * * *